United States Patent
Kujawa et al.

(10) Patent No.: US 7,392,761 B2
(45) Date of Patent: Jul. 1, 2008

(54) PET DISH DISPENSER WITH DISPOSABLE INSERTS

(76) Inventors: John Arthur Kujawa, 1243 Tally Ho Trail, Hubertus, WI (US) 53033; Christine Kujawa, 1243 Tally Ho Trail, Hubertus, WI (US) 53033

( * ) Notice: Subject to any disclaimer, the term of this patent is extended or adjusted under 35 U.S.C. 154(b) by 178 days.

(21) Appl. No.: 10/906,814

(22) Filed: Mar. 8, 2005

(65) Prior Publication Data

US 2006/0201434 A1    Sep. 14, 2006

(51) Int. Cl.
*A01K 5/01*    (2006.01)
(52) U.S. Cl. .............. 119/61.5; 220/495.01; 220/574.3; 220/495.07
(58) Field of Classification Search ................ 119/61.5, 119/51.01, 52.1, 53.5, 54, 61.1, 72, 74, 61.56, 119/61.3, 167, 170; 220/23.87, 23.88, 4.26, 220/495.01, 495.03, 574.3, 573.5, 495.06, 220/495.07
See application file for complete search history.

(56) References Cited

U.S. PATENT DOCUMENTS

| | | | | |
|---|---|---|---|---|
| 730,082 | A * | 6/1903 | Bates ...................... 220/574.3 |
| 1,961,360 | A * | 6/1934 | Herndon, Jr. et al. ........ 493/153 |
| 1,987,020 | A * | 1/1935 | Looft ............................. 4/655 |
| 3,076,579 | A * | 2/1963 | Kuhlman .................. 220/574.3 |
| 3,128,904 | A * | 4/1964 | Reilly .................... 220/495.07 |
| 3,362,604 | A * | 1/1968 | Lagostina .................... 220/574 |
| 3,546,716 | A * | 12/1970 | Laumann ....................... 4/452 |
| 3,698,594 | A * | 10/1972 | Boehlert ................ 220/495.01 |
| 3,809,013 | A * | 5/1974 | Rigney et al. ............... 119/167 |
| 3,844,445 | A * | 10/1974 | Haas .......................... 221/229 |
| 3,991,719 | A * | 11/1976 | Bruce ......................... 119/61.5 |
| 4,015,945 | A | 4/1977 | Frankel et al. .............. 422/224 |
| 4,182,462 | A * | 1/1980 | Buff, Jr. ................. 220/495.03 |
| 4,227,362 | A * | 10/1980 | Wallsten ...................... 53/447 |
| 4,800,845 | A * | 1/1989 | Budd ........................ 119/61.5 |
| 4,883,189 | A * | 11/1989 | Lobbert ...................... 220/260 |
| 4,910,977 | A * | 3/1990 | Hilton ........................ 62/457.5 |
| 5,121,712 | A * | 6/1992 | Schulein et al. ............. 119/167 |
| 5,320,243 | A * | 6/1994 | Hale ...................... 220/495.01 |
| 5,445,110 | A * | 8/1995 | Birnie ........................ 119/61.5 |
| 5,709,167 | A * | 1/1998 | Kelley ....................... 119/61.5 |
| 5,709,168 | A * | 1/1998 | Walker ...................... 119/61.5 |
| 5,782,374 | A * | 7/1998 | Walker .................... 220/23.87 |
| 6,644,493 | B1 * | 11/2003 | Walton et al. ............... 220/603 |
| 6,840,191 | B2 * | 1/2005 | Gaspary et al. ............ 119/61.5 |
| 2005/0133511 | A1 * | 6/2005 | Makriyiannis .............. 220/578 |
| 2006/0027176 | A1 * | 2/2006 | McQuade et al. .......... 119/61.5 |

* cited by examiner

*Primary Examiner*—Yvonne R. Abbott

(57) ABSTRACT

A pet dish apparatus that includes a spring loaded base unit, on top of which sits a permanent feeding and watering bowl. Multiple disposable bowls are nested in the permanent bowl, which keeps them aligned both vertically and horizontally. A hinged ring like lid that rims the apparatus and clamps down over the disposable bowls and outer top of apparatus to keep bowls in place, keeping them from popping up and keeping them free from food and debris that could be caught in between the disposable bowls and the inner lining of the apparatus. The spring loaded base will allow disposable inserts to rise to top of apparatus as each discarded bowl is removed. The permanent bowl can also be used for feeding when disposable bowls are unavailable. The solid construction of the base, weight of the apparatus and permanent bowl, and rubberized disc at bottom of bowl, will keep the pet dish apparatus stable to the floor.

2 Claims, 2 Drawing Sheets

PET DISH DISPENSER WITH DISPOSABLE INSERTS

BACKGROUND OF THE INVENTION

1. Field of the Invention

This invention relates in general to a need for new and useful improvements in animal feeders, and more particularly, to an animal feeder that will dispense clean disposable inserts as the soiled inserts are disposed of after animal's feeding or watering. The disposable inserts are adapted to fit into the permanent unit and can be used for dry and wet food or liquid beverages.

2. Brief Description of Related Art

Heretofore the types of pet dishes used or patented with disposable inserts have not been designed to automatically dispense disposable inserts and have not included a spring loaded base, which allows disposable inserts to pot up to top of base. The apparatus includes a hinged ring like lid at top, which will hold the stored inserts in place, keeping all other inserts clean, until top insert is discarded. This apparatus also includes a permanent bowl, which can be used should the disposable inserts be unavailable. The disposable insert is molded of a light paper weight wax coated material in which one or two tabs are part of the mold at the top of each insert for easy removal of top insert from apparatus.

U.S. Pat. No. 5,060,807 discloses a disposable bowl dispenser that stores and dispenses disposable bowls from a dish shaped base with retailing arms and support members. This skeleton-like frame may be lightweight, resulting in less than optimum stability. Because of its' open sides, which exposes the stack of disposable bowls, there is probability of bowls becoming soiled. To provide for greater stability, optimal cleanliness of disposable inserts, an outer shell surrounding the disposable inserts and a hinged ring like lid rimming the top of apparatus would be desirable. An outer shell would also provide the apparatus with aesthetic value and resemble a pet dish. It is also desirable to have a permanent feeding bowl in apparatus, should the disposable inserts become unavailable at feeding time. It is preferred to use a spring in place of the retailing arms for simplicity of manufacturing.

U.S. Pat. No. 6,644,241 discloses a dish-shaped base unit which has a first dish lock portion in the form of an annular groove on an inside surface of the dish-shaped base unit and includes a dish member received in the dish-shaped base unit. The dish member includes a second dish lock portion in the form of an annular tongue on the outside surface of the dish member which can attach to the first dish lock portion annular groove.

Although the base is solid, it is designed for storing multiple disposable inserts. It does not include a permanent bowl that can be used when disposable inserts aren't available. Its design of internal wall bulges allows for food and debris to enter unit between disposable inserts and apparatus, which allows disposable inserts to become soiled prior to use. A spring loaded base will allow disposable units to rise to top of apparatus allowing pet to easily access food and drink and hinged ring like lid fits tightly to top of apparatus, keeping all disposable inserts clean until used for feeding.

U.S. Pat. No. 4,949,678 discloses a disposable one-piece pet feeding dish having a thin walled outwardly sloping skirt. The dish displays an adhesive strip on bottom of unit to hold unit to the floor. Although stability to floor is important, adhesive to the floor may be damaging and more permanent than required. It is preferred to have a fairly heavy weight to the apparatus and rubberized disc at bottom to prevent slippage.

U.S. Pat. No. 4,257,353 discloses a disposable pet dish for feeding and watering pets, which is made of very thin disposable material with a turned lip at top of bowl. It also provides a skeletal frame support. It is designed to hold one disposable bowl at a time and is not designed to dispense multiple disposable bowls. Although the design of the disposable bowl is a molded one-piece unit, it has a turned lip to accommodate the support frame in which it snaps on. It is preferred to mold the thin disposable material in a bowl shape to fit into the solid casing of the designed apparatus and to include in the mold one to two tabs at the top rim for easy removal of discarded inserts from apparatus.

U.S. Pat. No. 4,800,845 discloses a pet dish that uses raised portions on holder and two depressions on liner to lock into place. This pet dish is designed to house up to two liners and is not a pet dish dispenser. It is preferred to have an automatic dispensing of disposable inserts of up to twenty and a permanent bowl when disposable inserts are not available.

U.S. Pat. No. 2,426,995 discloses an apparatus used for storing stacked articles. It is not designed to be a pet feeder. The design is skeletal and vertically elongated and does not contain a permanent feeder bowl, when disposable inserts are unavailable. It is preferred to have a unit that will be stable to the floor and not be tipped over by the animal when feeding or drinking from apparatus.

U.S. Pat. No. 5,782,374 discloses a disposable liner made of a paper type material such a wax coated paper. It contains an upper ridge to set on top rim of a pet dish. This dish is not designed to dispense multiple disposable inserts. It is preferred to use a hinged ring to rim the top of the apparatus and disposable inserts without a rim to be able to stack more units in the apparatus. One or two tabs molded to top edge of the disposable bowl will allow for easy removal of discarded inserts.

U.S. Pat. No. 5,709,168 discloses similar design to U.S. Pat. No. 5,782,374, in which this is a disposable liner with upper ridge to accommodate resting on top of pet dish. The dish includes two removable spring-type clips, which clamp the liner to the rim of the bowl. It is preferred to use a hinged ring to rim the top of apparatus, holding disposable inserts in place and covering the outer top rim of the apparatus.

DRAWING REFERENCE NUMERALS 1 rubber disc
2 spring
3 lower cylindrical shaped extremity
4 outer shell
5 lower portion of latch
6 lower portion of hinge
7 permanent bowl
8 upper cylindrical shaped extremity
9 disposable bowls
10 disposable bowl tabs
11 ring like lid
12 upper portion of hinge
13 upper portion of latch
14 base plate
15 outer wall of shell 4
16 inner wall of shell 4
17 outer wall of permanent bowl 7
18 outer wall of disposable bowl 9
A shell unit
B permanent bowl
C disposable bowls
I motion of lid opening and closing II motion of spring expanding and bowls moving upward
III motion of topmost disposable bowl removal

BRIEF DESCRIPTION OF THE DRAWINGS

The references previously labeled and described will now be elaborated further by the following drawings.

DETAILED DESCRIPTION OF THE PREFERRED EMBODIMENT

Figure 1:
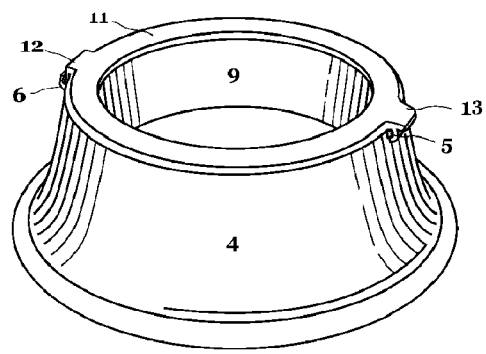
FIG. 1 is a perspective view of the pet feeding dish with the disposable bowls inserted and the ring like lid closed.
Figure 2:
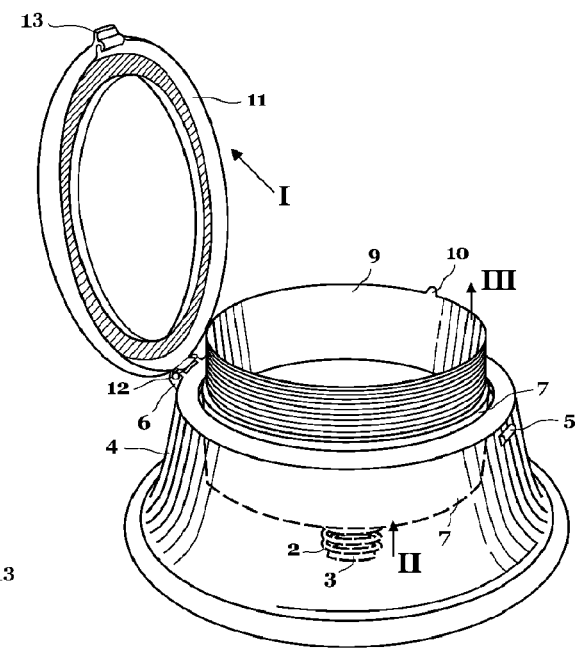
FIG. 2 is a perspective view of the pet feeding dish with the disposable bowls inserted and the ring like lid open.
Figure 3:
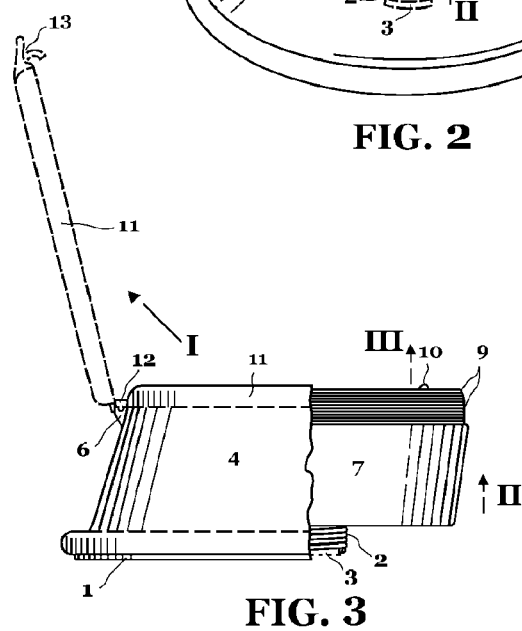
FIG. 3 is a vertical sectional view of the pet feeding dish partially broken away to better show the construction of the dish shown in FIG. 1.
Figure 4:
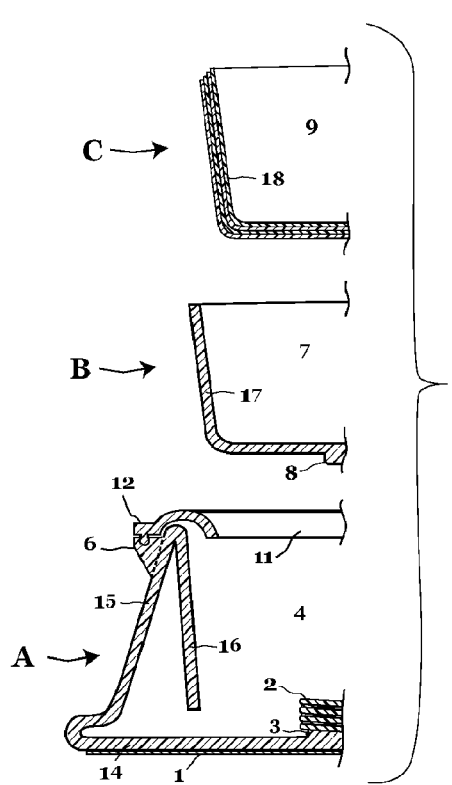
FIG. 4 is an exploded vertical sectional view showing the use of the permanent bowl and disposable bowls in connection with the pet feeder shell.
Figure 6:
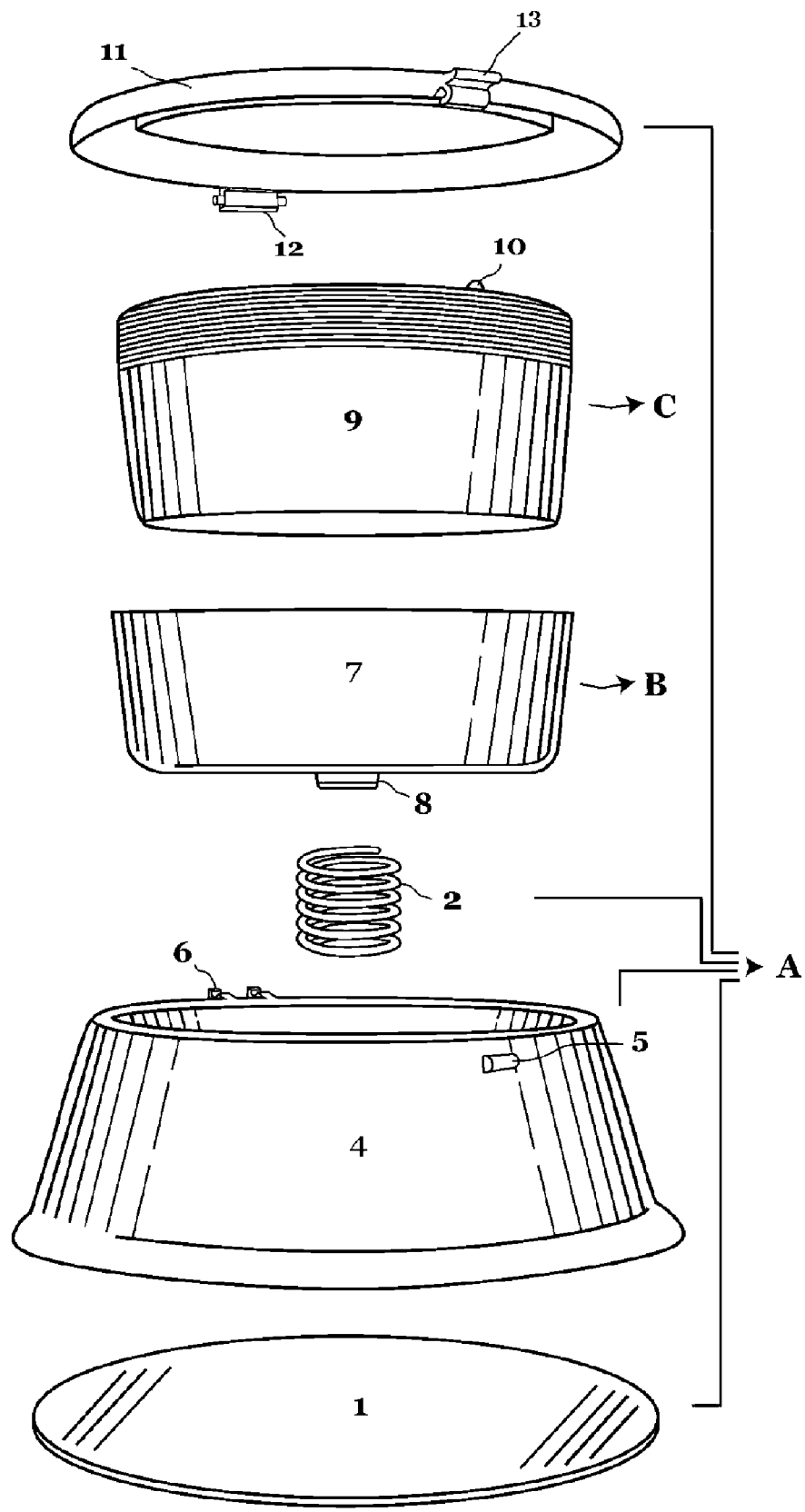
FIG. 6 is a fully exploded perspective view of the embodiment of the invention.

The pet dish dispenser with disposable inserts will now be described in detail with characters referring to the drawings that illustrate embodiments of the invention. As seen in FIGS. 4 and 6, A designates a shell unit that includes the shell 4, the rubber disc 1, the ring like lid 11, and the spring 2. B designates the permanent bowl 7 for use with the pet feeder A. C designates the disposable bowls 9 to be inserted into permanent bowl B.

Figure 5:
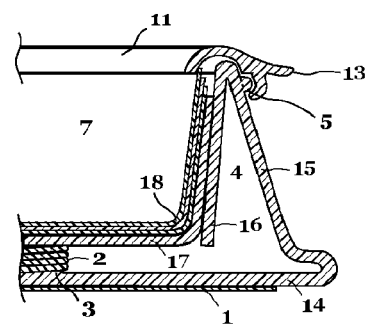
FIG. 5 is a vertical sectional view showing the permanent bowl, disposable bowls, and pet feeder shell as one unit.

Provided for use with the shell unit A is the permanent bowl B and disposable bowls C, as best shown in FIGS. 4-6 of the drawings. The permanent bowl B comprises a tapering cylindrical shaped wall 17 which conforms to and fits snugly within the tapering cylindrical shaped wall 16 of the shell unit A. The disposable bowls C also comprises a tapering cylindrical shaped wall 18 which conforms to and fits snugly within the tapering cylindrical shaped wall 17 of the permanent bowl B.

The shell unit A as seen in FIGS. 2-6 comprises a base, such as a circularly shaped plate 14 for disposition on a supporting surface, such as the floor. Secured to and extending upwardly from the base 14 is a shell housing 4 comprising a tapering cylindrically shaped outer side wall 15 and an inner vertical wall 16 forming an interior cavity for permanent bowl 7 to be inserted. The spring 2 fits snugly around lower cylindrical shaped extremity 3 protruding upwardly from the base 14 of the shell 4 and to the upper cylindrical shaped extremity 8 protruding downwardly from the permanent bowl 7. The spring 2 provides upwardly pressure to permanent bowl B. A ring like lid 11 is connected to shell 4 by a snapping hinge 12 & 6 on one end and closes securely with a latch 13 & 5 on the opposite end. The ring like lid 11 is used to provide downwardly pressure to the disposable bowls C and permanent bowl B with use of spring 2 to provide upwardly pressure. The ring like lid 11 fits snugly around top of shell 4 and comprises a smooth curved surface for comfort of pets.

The permanent bowl B as seen in FIGS. 2-5 is used to nest the disposable bowls C, however, it can also be used for pet food or water.

The disposable bowls C as seen in FIGS. 1-6 are of lightweight material made up of wax-coated paper. The disposable bowls 9 comprises a tapering cylindrical shape, which is ideal for stacking. A tab 10 is used for discarding soiled topmost disposable bowl 9 and because the disposable bowls are designed without a top rim, will allow for maximum capacity stacked in unit.

Operation

The pet dish dispenser with disposable inserts will provide pets with clean bowls by easily discarding soiled bowls.

To prepare the device for feeding, the user will open the lid and insert approximately 20 disposable bowls. The bowls are held into place and secured by closing the ring like lid. The spring mechanism exerts sufficient pressure from the underside of the permanent bowl to hold all bowls firmly in place. The user will now add pet food or water to the topmost bowl. When soiled, the user will open the lid and remove the topmost bowl by pulling on attached tab(s). A clean bowl is now exposed. When all disposable bowls are discarded, a new supply is loaded in the permanent feeder. If disposable bowls are unavailable or user wishes, the permanent bowl may be used for pet food or water. The user is, however, encouraged to keep the feeder clean quickly and easily with the use of the disposable bowls.

The pet dish dispenser with disposable inserts is not limited to the shape or materials described above. Design aspects, such as the hinge and latch, may be altered while maintaining functions described above. This design may also be suitable and intended to serve as a feeding device for infants and toddlers, with minor changes to aesthetic outer shell design.

What is claimed is:

1. A pet dish apparatus for feeding, storing and dispensing a number of disposable bowls, with uppermost bowl and edge of said bowl being held and covered by a rim that is hinged on top of apparatus to keep said bowls clean and debris out of apparatus, and comprised of the following:

a. a retaining base means made of plastic compound that enables the device to rest on generally flat surfaces, and is comprised of a vertically extending open top casing having a hinged open lid to fit top of casing, bottom rubber stabilizer, a permanent bowl on which the disposable bowls nest, a compression spring disposed between the permanent bowl and base plate to support said permanent bowl and its load of disposable bowls, said spring having a uniform pitch from base to top plate and being of substantially less diameter than said casing, in which the retaining means is designed to hold up to 35 disposable bowls horizontally aligned to said retaining base means which fully encompasses said disposable bowls, b. a means of support made of a spring substance and attached to bottom inside of retaining base means, in which said support means exerts upward pressure on the underside of load of disposable bowls, whether one bowl or 35 bowls are loaded in the device, c. a means to secure disposable bowls in retaining base means, said means is made of a plastic compound ring hinged to top of retaining base means to hold disposable bowls in place by exerting pressure on topside rims of disposable bowls and said means snaps shut when pushed down on upper rim of retaining base means, d. a dish member means made of plastic compound that nests inside of retaining base means and sets on top of bottom support means, said dish member means is shaped slightly larger than disposable bowls, so disposable bowls set inside and are kept horizontally aligned to said retaining base means, whether one is inserted or up to 35; said dish member can also be used for feeding pet when disposable bowls are not available, e. a stabilizer means made of thin strip of rubber attached to bottom of retaining base means to prevent slippage on flat surfaces.

2. The pet dish apparatus of claim 1 wherein the disposable bowls are designed and molded to fit snuggly into the dish, and wherein the disposable bowls are made of recyclable plastic to accommodate both dry and wet food and liquid beverages.

* * * * *